United States Patent [19]
Ratkovich

[11] 4,005,840
[45] Feb. 1, 1977

[54] ADJUSTABLE ARM SUPPORT
[76] Inventor: John M. Ratkovich, 188 Industrial Drive, Suite 16, Elmhurst, Ill. 60126
[22] Filed: Feb. 17, 1976
[21] Appl. No.: 658,289
[52] U.S. Cl. .............................. 248/118; 248/421; 211/202
[51] Int. Cl.² .......................................... B68G 5/00
[58] Field of Search ............ 248/118, 118.1, 118.3, 248/118.5, 277, 421; 211/179, 202; 108/145; 297/414, 418; 160/137, 138, 139, 140, 159, 160, 161; 74/521; 187/18, 8.71, 8.72

[56] References Cited
UNITED STATES PATENTS

| 647,299 | 4/1900 | Gates | 211/202 |
| 2,172,178 | 9/1939 | Rosenberg | 248/118 |
| 2,282,608 | 5/1942 | Rempel | 74/521 |
| 2,308,158 | 1/1943 | Dahl | 160/161 |
| 2,403,654 | 7/1946 | Gerdes | 248/118 |
| 2,642,117 | 6/1953 | Glauber | 248/118 |
| 2,667,913 | 2/1954 | Dustin | 297/414 |
| 3,929,309 | 12/1975 | Devore | 248/118 |

FOREIGN PATENTS OR APPLICATIONS

| 450,850 | 7/1936 | United Kingdom | 211/202 |
| 11,783 | 8/1888 | United Kingdom | 211/202 |

Primary Examiner—Robert A. Hafer
Attorney, Agent, or Firm—Watson D. Harbaugh

[57] ABSTRACT

An adjustable, compact and foldable rest for supporting both arms primarily upon a seated person's knees.

3 Claims, 6 Drawing Figures

ADJUSTABLE ARM SUPPORT

BACKGROUND OF THE INVENTION

Although a rest to support one arm on one knee has been provided by Rosenberg U.S. Pat. No. 2,172,178, the support is a single upright which is unsteady, subject to swaying, and is cumbersome and unsuitable for compacting for carrying without damage or inconvenience to clothing and people in a crowd.

A portable rest for both arms is shown by Glauber U.S. Pat. No. 2,642,117, but it is designed to rest upon the ground or floor, and although collapsible, it is very difficult to handle and carry. The arm support provided also is at a definite height, that is, unvariable.

SUMMARY OF THE INVENTION

One of the objects of the invention is to provide a light, compact folded arm support unit which can span both legs of a person, when seated, anywhere along the length of the thighs; will accommodate any spacing of the legs; and will support both arms at an adjustable height with equal distances between the hips and shoulders, the arms, elbows, and the legs.

With the arm rest resting on both knees and supporting both elbows, the support is particularly useful in watching athletic contests without any side sway when supporting binoculars. It further permits the user to flex his feet to raise and lower binoculars if desired to follow the viewed action vertically, thereby eliminating any need for the user to crane his neck or lower his head to follow the action. Moreover, the weight of arms and bi- noculars are tirelessly carried by the legs which, as a matter of course, are accustomed to carrying even heavier loads for long periods of time.

A further object of the invention is to provide a foldable arm rest which is easily heightened by lifting whichever end is uppermost, and when locked or relocked in position the locking latch is held in latching position by the weight of the arms resting upon the support.

A further object is to provide a leg-to-arm support which is inexpensive, strong and adjustable under a wide range of conditions, yet can be folded when not in use to provide a light, compact unit which can be carried or placed in a carrying case without inconvenience to the owner or people around him.

IN THE DRAWINGS

Figure 4:
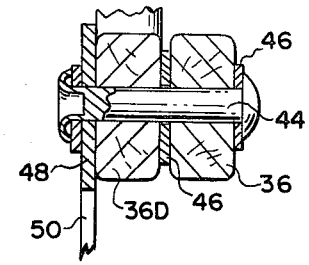
Figure 5:
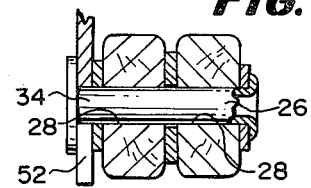
Figure 6:
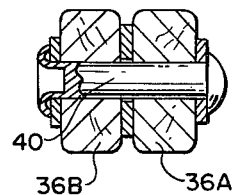
Figure 2:
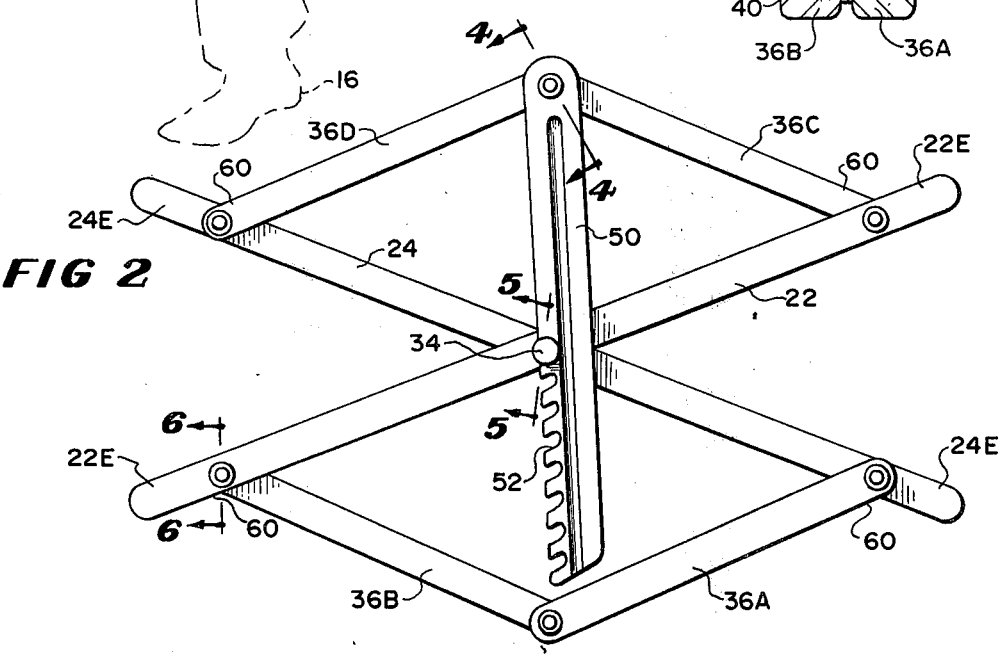
FIG. 2 is a plan view of a support as used in one of its shortest positions.

FIGS. 4, 5 and 6 are sectional views taken on lines 4—4, 5—5 and 6—6, respectively, in FIG. 2.

DESCRIPTION OF THE PREFERRED EMBODIMENT

Figure 1:
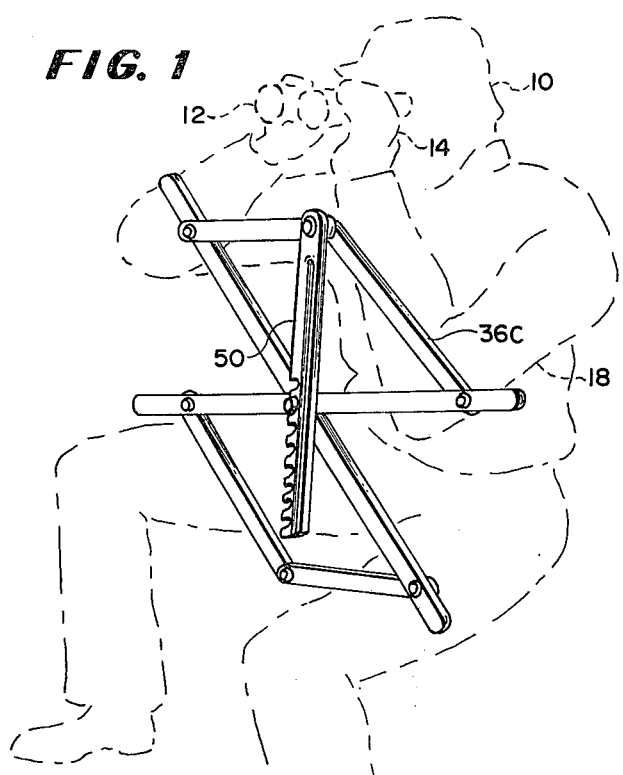
FIG. 1 is a perspective view of the arm rest support embodying the invention in use with the user shown in broken lines.

Referring now to FIG. 1 in further detail, a man 10 is shown in phantom, using a pair of binoculars 12 supported by both hands 14 at eye level while seated with his feet 16 on a floor and his arms 18 bent to support the binoculars in a steady position for viewing a sport contest. The folding support 20 is made up of two long strips 22, 24 made of a rigid material such as wood and pivoted together in overlapping relation at their midpoints as shown in FIG. 5 by a headed rivet 26 extending through journals 28 with the strips held apart by washers 30 located with one of the washers located therebetween and two washers located on both sides of the strips. As viewed in FIG. 5, the rivet 26 is located in spaced relation from its adjacent washer to expose the shank portion 34 of the rivet to serve as a latch element.

Shorter lengths of strips 36 are pivoted together in overlapping relationship at their ends as shown in FIG. 6 by rivets 40 with washers 42 on remote sides and one of them between the strips 36. These strips may be referred to as strips 36A and 36B, for future reference, as located below the rivet 26 in FIG. 2. Another pair of strips 36 as shown also in FIG. 2 are commonly pivoted together at their adjacent ends by a rivet 44 as shown in FIG. 4 where two washers 46 are located between and on one side of the strip 36C but with one end 48 of a latch member 50 located on the outer side of the strip 36D as shown in FIG. 4.

The latch member 50 is notched along its lower end to provide spaced notches 52 to selectively engage the rivet portion 34 with the notches inclined to the axis of the latch to hold engagement in a weight bearing relation.

Figure 3:
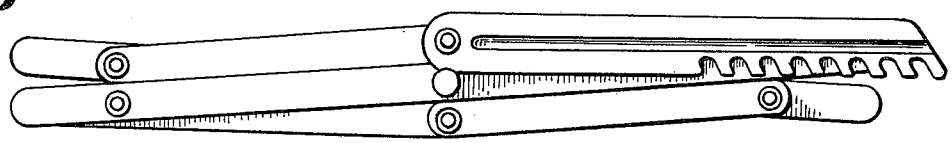
FIG. 3 is a planned view of a support as folded for carrying or storage.

At their remote or free ends, the strips 36 overlap the extending arms 32, 34 and are pivotally secured thereto as shown in FIG. 6 in a manner in which strips 36A, 36B are on the same side of strip 24 and strips 36B, 36C are on the same side of strip 22, whereby, when free of the restraint of the latch 50 the strips can collapse into a compact, folded carrying relationship as shown in FIG. 3 which is no thicker than two strips side-by-side and no wider than three strips disposed edge to edge.

When expanded from the collapsed position, the centrally located pivot joints may be separated as far as desired to space the remote pivoted joints as far as desired. The vertically adjacent ends 22E and 24E of the strips 22, 24 extend divergingly beyond the pivotal joints located at the ends of the strips 22, 24 and when spaced a desired distance far enough for any notches to engage the rivet portion 34 of rivet 26 the elements are rigidly held in weight-bearing relation against collapsing until the latch is again released.

It will be noted that the convergence between strips 36 and respec- tive strips 22, 24 define oppositely facing obtuse angles which serve as cradles 60. The lower cradles rest on the legs of the user any desired place along the length of the thighs and the upper cradles receive in weight bearing relation the elbows or portions of the forearms or wrists of the user depending upon the adjusted length of the latch as desired by the user. In this relationship the optical axes of the binoculars may be inclined upwardly or downwardly as desired or sidewise by flexing the feet 16, and, without any swaying of the wrists the axes of the binoculars can be moved laterally in a horizontal direction merely by moving the arms and legs in that direction and adjusting the level of the support by relative action of the feet 16.

Furthermore, it may be noted that either end of the support can be uppermost and the greater extension of the latch adjustment the closer the cradles will be at their respective levels. This adjustment or correction of an initial adjustment can be quickly and easily accomplished with the hands and arms being removed from the upper cradles and the latch manipulated to a new position of adjustment.

What is claimed is:

1. A leg-to-arm support comprising two long strips pivoted centrally together at a predetermined axis to define four extending positions;

two pairs of shorter strips of a length less than one-half the length of the longer strips, the members of each pair being terminally pivoted to each other on axes spaced vertically from each other, the three axes being parallel and spaced in a straight line with respect to one another;

means for pivotally mounting the remote end of each of said two pairs of shorter strips to the four portions of said longer strips intermediate their remote ends for relative pivotal movement to provide oppositely facing vertically spaced pairs of cradles defined by converging ends of the longer and shorter strips defining obtuse angles at their pivotal engagement to support arms and legs resting thereon against lateral movement.

2. The support defined in claim 1, including latch means defined by a movable member and a stationary member engaged by the movable member, said movable member being pivotally mounted on one of the three axes and the other member of the latch means being mounted on another one of the three axes adjacent thereto.

3. The support defined in claim 2 in which said movable member has notches inclined inwardly in the direction of weight engagement thereof selectively with said stationary member.

* * * * *